US007525560B2

(12) United States Patent
Yamamoto

(10) Patent No.: US 7,525,560 B2
(45) Date of Patent: Apr. 28, 2009

(54) IMAGE FORMING APPARATUS AND CONTROL METHOD THEREOF

(75) Inventor: Takeo Yamamoto, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 11/370,926

(22) Filed: Mar. 9, 2006

(65) Prior Publication Data

US 2006/0203071 A1 Sep. 14, 2006

(30) Foreign Application Priority Data

Mar. 11, 2005 (JP) ............................ 2005-069800
Feb. 24, 2006 (JP) ............................ 2006-048981

(51) Int. Cl.
*B41J 2/385* (2006.01)
*G06K 15/00* (2006.01)

(52) U.S. Cl. ...................................... 347/131; 358/3.1

(58) Field of Classification Search ................ 347/131; 358/3.1

See application file for complete search history.

(56) References Cited

U.S. PATENT DOCUMENTS

| | | | | |
|---|---|---|---|---|
| 4,794,421 A | 12/1988 | Stoudt et al. | ................ | 399/184 |
| 5,291,311 A * | 3/1994 | Miller | ....................... | 358/3.23 |
| 5,359,433 A * | 10/1994 | Nagase et al. | ............... | 358/466 |
| 5,479,175 A | 12/1995 | Cianciosi et al. | ............ | 347/252 |
| 5,729,626 A * | 3/1998 | Hada et al. | .................. | 382/170 |
| 5,831,657 A * | 11/1998 | Sakaue et al. | ............... | 347/131 |
| 6,088,512 A * | 7/2000 | Ancin et al. | ................. | 358/1.9 |
| 6,112,041 A | 8/2000 | Yamamoto | .................. | 399/138 |
| 6,266,156 B1 * | 7/2001 | Tanimura et al. | ............. | 358/1.9 |
| 7,221,483 B2 * | 5/2007 | Yagishita et al. | ........... | 358/3.13 |
| 7,298,902 B2 * | 11/2007 | Cichielo et al. | ............. | 382/184 |
| 2002/0031276 A1 | 3/2002 | Yagishita et al. | ............ | 382/252 |
| 2004/0165057 A1 | 8/2004 | Shimizu | ..................... | 347/250 |

FOREIGN PATENT DOCUMENTS

| | | |
|---|---|---|
| EP | 1499112 | 1/2005 |
| JP | 6-161195 | 6/1994 |

OTHER PUBLICATIONS

Chinese Office Action dated May 9, 2008 from corresponding Chinese Application No. 2006100573460, and English language translation thereof.

* cited by examiner

*Primary Examiner*—Kendrick X. Liu
(74) *Attorney, Agent, or Firm*—Fitzpatrick, Cella, Harper & Scinto

(57) ABSTRACT

It is determined whether a low density area in which pixels having density less than a predetermined density exist in succession is included in an image signal or not, and if the low density area exists, an image is formed by irradiating the laser light in a first condition for a pixel to be interested in each pixel area within the low density area and irradiating the laser light in a second condition being different from the first condition for other pixels in the pixel area. In this way, it is possible to improve reproducibility of a highlight area in a high resolution image and improve reproducibility of characters and line images or the like.

10 Claims, 14 Drawing Sheets

HALFTONE PROCESSED CHARACTER WITH 268 LINES

HALFTONE PROCESSED CHARACTER WITH 116 LINES

IMAGE FORMING APPARATUS AND CONTROL METHOD THEREOF

FIELD OF THE INVENTION

The present invention relates to an image forming apparatus which forms an image on a recording medium according to an electrostatic latent image formed by an exposure of laser light, and a control method thereof.

BACKGROUND OF THE INVENTION

An imaging apparatus such as a copier and printer is generally designed to form an electrostatic latent image on a photosensitive drum which is a latent image carrier using a laser beam. Such an apparatus modulates a laser beam oscillated by a laser oscillator according to an image signal and irradiates the laser beam onto a polygonal mirror rotating at a high speed. This laser beam is reflected by the polygonal mirror, deflected and scanned along an axial direction of the photosensitive drum as it rotates. This laser beam forms an image on the photosensitive drum through an image forming lens, forming an electrostatic latent image according to each scanning line of the image.

This type of image forming apparatus is required to form a high resolution image from the standpoints of reproducibility and proportion or the like of fine characters and, for example, many apparatuses whose image forming unit has a resolution of 1200×1200 dpi or above are being realized. Furthermore, there is a proposal as described in Japanese Patent Laid-Open No. 6-161195 of controlling an amount of laser exposure and setting conditions of the apparatus according to image information (attribute) to maintain image quality of plane image (tone image) and line image (character and line image).

However, in the case of the above described conventional technology, if tone images, characters and line images are mixed in the same image, it is quite difficult to realize image qualities of the tone image and characters satisfactorily. Especially, when resolution of an image forming apparatus is increased, the difference between both image qualities becomes more noticeable.

More specifically, when plane image (tone image) forming conditions are set over an entire image, the line image (character and line images) in the image fattens, and therefore crushing of fine characters in particular, that is, deterioration of resolution occurs. Furthermore, when line image (character and line image) forming conditions are set over the entire image, a maximum optical density of the plane image (tone image) in the image decreases. In a full color image forming apparatus in particular, its reproducible color range decreases and a satisfactory image cannot be obtained.

Moreover, when the resolution is increased, it is not possible to solve the problem that the reproducibility of the low density area of the tone image becomes unstable. FIG. 12A shows a schematic view of a latent image profile when an electrostatic latent image of a 1-pixel, 100% image is formed on an image carrier with a resolution of 600×600 dpi. FIG. 12B shows a schematic view of a latent image profile when an electrostatic latent image of a 1-pixel, 100% image is formed on an image carrier with a resolution of 1200×1200 dpi. Here, an integrated amount of laser beam at each apparatus is constant so that both optical densities become the same. As is obvious from this figures, when a latent image is formed with a higher resolution (FIG. 12B), the electrostatic latent image is shallow and more widely distributed.

Examples of factors that an optical density of image changes include a variation of electric charge potential of the image carrier (photosensitive drum), variation of potential of the exposure unit, variation of developing bias and variation of electric charge of a developer.

FIG. 13A to FIG. 13F relatively illustrate such variation factors of optical density of image using a variation of developing bias.

FIG. 13A to FIG. 13C depict a potential distribution 1002 of an electrostatic latent image per pixel of a 1-pixel, 100% image with a resolution of 600×600 dpi. On the other hand, FIG. 13D to FIG. 13F depict a potential distribution 1002 of an electrostatic latent image per pixel of a 1-pixel, 100% image with a resolution of 1200×1200 dpi. Reference numeral 1001 denotes a developing bias level and a portion 1003 below this developing bias level 1001 is the development portion which is developed (having an area proportional to the optical density) and is equivalent to the amount of toner adhered.

In FIG. 13A and FIG. 13D, the developing bias 1001 is substantially a reference value and the area demarcated by this developing bias 1001 corresponds to the amount of toner, that is, optical density and both have substantially the same optical density in this condition. On the other hand, as shown in FIG. 13B and FIG. 13E, when the developing bias level 1001 is raised, the optical density when an image with resolution 1200 dpi is formed (FIG. 13E) is greater than the optical density when an image with resolution 600 dpi is formed (FIG. 13B) and the size of the pixel (dot) with resolution 1200 dpi (FIG. 13E) is greater. On the contrary, as shown in FIG. 13C and FIG. 13F, when the developing bias level 1001 is lowered and the development contrast is decreased, the optical density when the image with resolution 600 dpi is formed (FIG. 13C) is greater than the optical density when the image with resolution 1200 dpi is formed (FIG. 13F). Thus, it is appreciated that when compared with the case with resolution 600 dpi, the optical density becomes unstable when an image is formed with higher resolution 1200 dpi.

When, for example, an image pattern as shown in FIG. 6 is formed under such a condition, the uniformity of optical density in a halftone, highlight area in particular, deteriorates, resulting in a rough image with high perceived granularity because variations of optical density in different positions are large.

Furthermore, a technique for stabilizing a latent image by changing halftone processing and reducing the apparent number of lines is also proposed and realized. However, little effect is obtained with regard to the highlight area until the latent image is stabilized, that is, the image data is increased to a certain degree as in the case of the above explanation. This is because even if the processing is changed and the number of the lines is reduced, the basic resolution of image data itself cannot be changed (reduced) and as a result, a shallow, wide electrostatic latent image is formed in the highlight area. That is, even when conventional technologies are combined, it has been impossible to achieve all of stability of optical density of the tone image within an identical image, highlight area in particular, smoothness, improvement of resolution of a character/line image and uniformity of proportion as the level of resolution of an image forming apparatus increases.

SUMMARY OF THE INVENTION

It is an object of the present invention to solve the disadvantages of the above described prior arts.

A feature of the present invention is to provide an image forming apparatus and a control method thereof capable of stabilizing optical density of image in a highlight area and improving reproducibility of, for example, isolate dots.

According to the present invention, there is provided with an image forming apparatus, comprising:

an image carrier;

exposure unit configured to irradiate laser light onto the image carrier according to an image signal and forming an electrostatic latent image;

discrimination unit configured to discriminate a low density area in which pixels having less than a predetermined density exist in succession in the image signal; and exposure control unit configured to control the exposure unit to irradiate the laser light in a first condition for a pixel to be interested of a pixel area in the low density area discriminated by the discrimination unit, and to irradiate the laser light in a second condition being different from the first condition for pixels other than the pixel to be interested in the pixel area.

Further, according to the present invention, there is provided with a method for controlling an image forming apparatus for forming an image on a record medium, the image forming apparatus comprises an image carrier and an exposure unit for irradiating laser light on the image carrier according to an image signal and forming an electrostatic latent image, the method comprising:

a discrimination step of discriminating a low density area in which pixels having less than a predetermined density exist in succession in the image signal; and an exposure control step of controlling the exposure unit to irradiate the laser light in a first condition for a pixel to be interested of a pixel area in the low density area discriminated in the discrimination step, and to irradiate the laser light in a second condition being different from the first condition for pixels other than the pixel to be interested in the pixel area.

The above described feature is achieved by a combination of features described in the independent claims and subordinate claims are intended to specify more advantageous specific examples of the present invention.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description serve to explain the principles of the invention.

DETAILED DESCRIPTION OF THE PREFERRED EMBODIMENTS

With reference now to the attached drawings, preferred embodiments of the present invention will be explained in detail below. The following embodiments are not intended to limit the present invention according to the claims and not all combinations of features are essential to the means for solving the problems of the present invention.

First Embodiment

Figure 1:
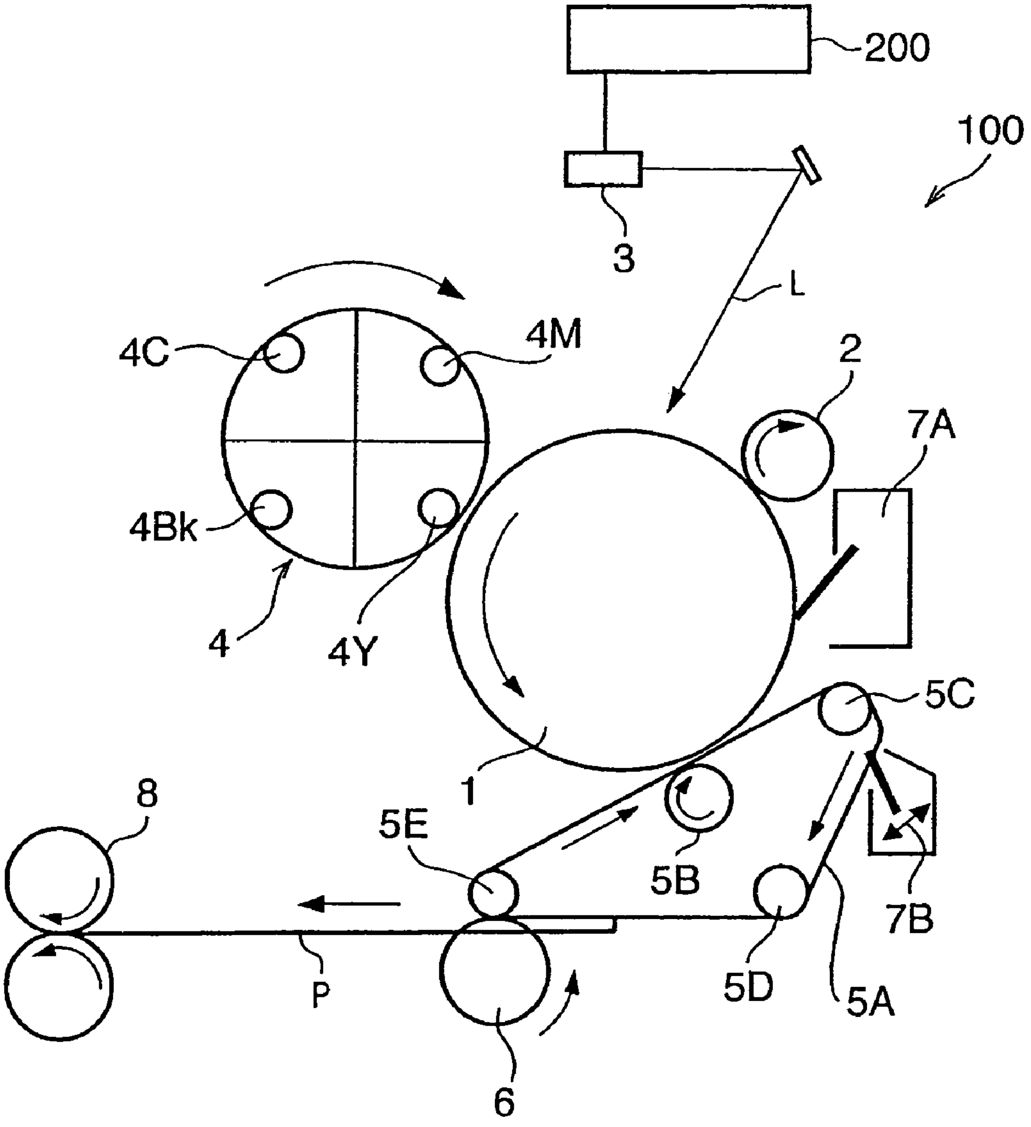
FIG. 1 depicts a view explaining main components of a photo-electric full color printer which is an image forming apparatus according to an embodiment of the present invention.

FIG. 1 depicts a view explaining main components of a photo-electric full color printer which is an image forming apparatus according to an embodiment of the present invention.

This laser printer 100 is connected to a reader unit 200 or united therewith. The reader unit 200 is an apparatus which converts information input from an external device into an image signal and supplies the image signal to the printer 100. The reader unit 200 may be an image processing apparatus having a scanner which reads a document image or personal computer or the like and the reader unit 200 supplies a luminance signal of the document image and image data subjected to predetermined image signal processing. The printer 100 according to the embodiment can perform printing with a resolution of, for example, 1200×1200 dpi and image data supplied from the reader unit 200 is eventually converted to a resolution of 1200×1200 dpi. Furthermore, gradation expression with 16 levels per pixel is possible and pulse width modulation is used as this gradation reproduction means. This printer 100 can reproduce gradation with 256 levels (levels 0 to 255).

The image signal supplied from the reader unit 200 can be separated into a solid image or so-called tone image, character and line images (line image) using well-known image area separation means. Furthermore, tags for discriminating a tone image, character and line images of an image signal transferred from a personal computer or the like are also generally transferred simultaneously. The tone image, character and line images included in the image signal are separated based on the tags, and it is possible to execute image processing most suitable for the respective images and form (print) an image.

This full color printer (hereinafter, simply referred to as "printer") 100 is provided with a photosensitive drum 1 as an image carrier, acts on this photosensitive drum 1 and forms an electrostatic latent image which corresponds to each color on the drum 1 according to the image data from the reader unit 200. The electrostatic latent image which corresponds to each color becomes an image (toner image) developed with a developer of the corresponding color. The toner image of each color formed in this way is transferred to an intermediate transfer belt 5A which is an intermediate transfer member for each color and this transferred image (color image) is transferred to a recording sheet which is a transfer sheet P by a transfer roller 6. This will be explained in detail below.

The printer 100 applies an electric charge bias to a charge roller 2 in an electric charge process and uniformly charges the surface of the photosensitive drum 1 to a predetermined potential. Next, in a latent image forming process, the printer 100 drives an exposure unit (including a semiconductor laser) 3 according to the image data of colors such as yellow, magenta, cyan and black from the reader unit 200 and irradiates laser light L according to the image data of each color onto the photosensitive drum 1. This causes the surface potential of the part irradiated with laser light to be changed on the surface of the photosensitive drum 1 which is uniformly charged to the predetermined potential and that part becomes an electrostatic latent image.

The developing unit 4 is provided with a plurality of developing devices containing developers (toners) of the respective colors in which a toner and carrier are mixed at a predetermined ratio for each developer color. The developing unit 4 here includes a yellow developing device 4Y containing a yellow developer, a developing device 4M containing a magenta developer, a developing device 4C containing a cyan developer and a developing device 4Bk containing a black developer, and these four developing devices constitute a rotary developing unit. In a developing process, these developing devices sequentially transfer developers to the latent image part formed on the photosensitive drum 1. In this way, a toner image according to the electrostatic latent image of each color is formed on the photosensitive drum 1.

Here, when a toner image of a certain color is formed on the photosensitive drum 1 by one developing device, in the next transfer process, the toner image on the photosensitive drum 1 is transferred to the intermediate transfer belt 5A which is an intermediate transfer body by a transfer roller 5B. The intermediate transfer belt 5A is reeved around rollers 5C, 5D and 5E. A toner image formed by a developing device of another color is transferred superimposed on the toner image previously formed on the intermediate transfer belt 5A. This procedure is executed repeatedly as many times as colors. In this way, the toner images of four colors formed by the developers from the four developing devices are superimposed on the intermediate transfer belt 5A. In this transfer process, the color toner image formed on the intermediate transfer belt 5A is further transferred to the transfer member P by the transfer roller 6. This unfixed toner image formed on this transfer member P is fixed by a fixing unit 8 in a fixing process.

In the above described image forming process, the toner or the like remaining on the photosensitive drum 1 is removed by a cleaner 7A. On the other hand, the toner or the like remaining on the intermediate transfer belt 5A is removed by a cleaner 7B. After these previously formed toner images are removed, the next image is formed.

Next, the photosensitive drum 1 which is the image carrier, charge roller 2, exposure unit 3, developing unit 4, intermediate transfer belt 5A, transfer rollers 5B and 6 used in the above described image forming process will be explained in detail.

For the photosensitive drum 1, this embodiment uses an OPC photosensitive material of 80 mm in diameter, 320 mm in length. The photosensitive drum 1 includes a conductive drum base made of aluminum or the like and a photosensitive body (negative photosensitive body) having a negative polarity made up of a photosensitive layer (photoconductive layer) formed on the outer surface and is driven to rotate at a process speed (circumferential velocity) of 150 mm/sec in the direction indicated by an arrow.

The charge roller 2 is a roller having a multilayered structure made up of a cored bar in the center, an elastic conductive layer formed as a concentric integrated body around the outer surface thereof and a resistive layer formed around the outer surface thereof. The elastic conductive layer is a single layer or a composite layer made of, for example, conductive rubber of 104 [Ω·cm] or less and the resistive layer is a single layer or a composite layer made of conductive rubber of 107 to 1011 [Ω·cm] having a thickness of approximately 100 [μm] or less. This charge roller 2 is pressed against the photosensitive drum 1 under a predetermined pressure by pressing means (not shown) with both ends of the cored bar supported in a freely rotatable manner by a bearing member (not shown), and the charge roller 2 rotates following the rotation and driving of the photosensitive drum 1 in this embodiment.

Furthermore, a charge bias which is a predetermined bias voltage is applied to the cored bar of the charge roller 2 by a power supply (not shown), and the outer surface of the photosensitive drum 1 is uniformly charged by contacting this charge roller 2. In this embodiment, an AC charging system which has an excellent potential convergence characteristic is used as the method of applying this charge bias. This AC charging system is a DC bias superimposed on an AC bias and when the AC bias is equal to or greater than a predetermined electric field, the potential of the photosensitive drum 1 converges to a level substantially equivalent to the DC bias.

In this embodiment, a sine wave of frequency 1200 Hz with Vpp 1.7 kV is used as the AC bias and −620 V is applied as the DC bias, and in this way the surface potential of the photosensitive drum 1 can be set to −600 V.

Image data of each color of yellow (Y), magenta (M), cyan (C) and black (Bk) for emission (exposure) of laser light L is image data corresponding to four colors subjected to predetermined image processing by the reader unit 200. The image data of these 4 colors is transferred to the exposure unit 3 in synchronization with the image reading operation of an image reading apparatus of the reader unit 200.

In this embodiment, when the image data of each color formed by the laser light L emitted from this exposure unit 3 is a solid image, the amount of exposure is adjusted so that the surface potential of the photosensitive drum 1 of the image part becomes −180 V. More specifically, an adjustment is made so that the amount of stationary light on the photosensitive drum 1 becomes 0.68 mW. That is, the surface potential of −600 V on the charged surface is reduced to the potential corresponding to the latent image part by the laser light L. The part where the surface potential of the photosensitive drum 1 has been changed becomes an electrostatic latent image in this way.

All the developing devices 4M, 4Y, 4C and 4Bk of their respective colors distributed to the rotary developing unit are developing devices of a two-component system and the developers accommodated in the respective developing devices are two-component developers in which a toner and magnetic particles (carriers) are mixed at a predetermined ratio. In each developing device, the developer is bound onto a developing sleeve which is a developer carrier containing a magnet, the developer is moved on the photosensitive drum 1 by a developing bias (not shown) so that an image of a desired optical density is formed. Furthermore, all the toners in this embodiment have negative polarities (nega-toners). This embodiment uses an AC bias of a square wave of frequency 2400 Hz with Vpp 2.0 kV and a superimposed DC bias of −450 V as developing biases when forming an image. Furthermore, the ratio of developers in each developing device is set so that a maximum optical density of each color becomes 1.5 (optical density). In this embodiment, the ratio of the toner to carrier (hereinafter referred to as "T/C ratio") is set to 10% for each color. The average amount of electric charge of the developer at this time is 32 [μC/mg].

Under such conditions, the toner on the photosensitive drum 1 is developed according to the potential corresponding to the difference between the surface potential and the DC bias of development and the amount of electric charge of the toner and the optical density of the image formed is uniquely determined.

Figure 2:
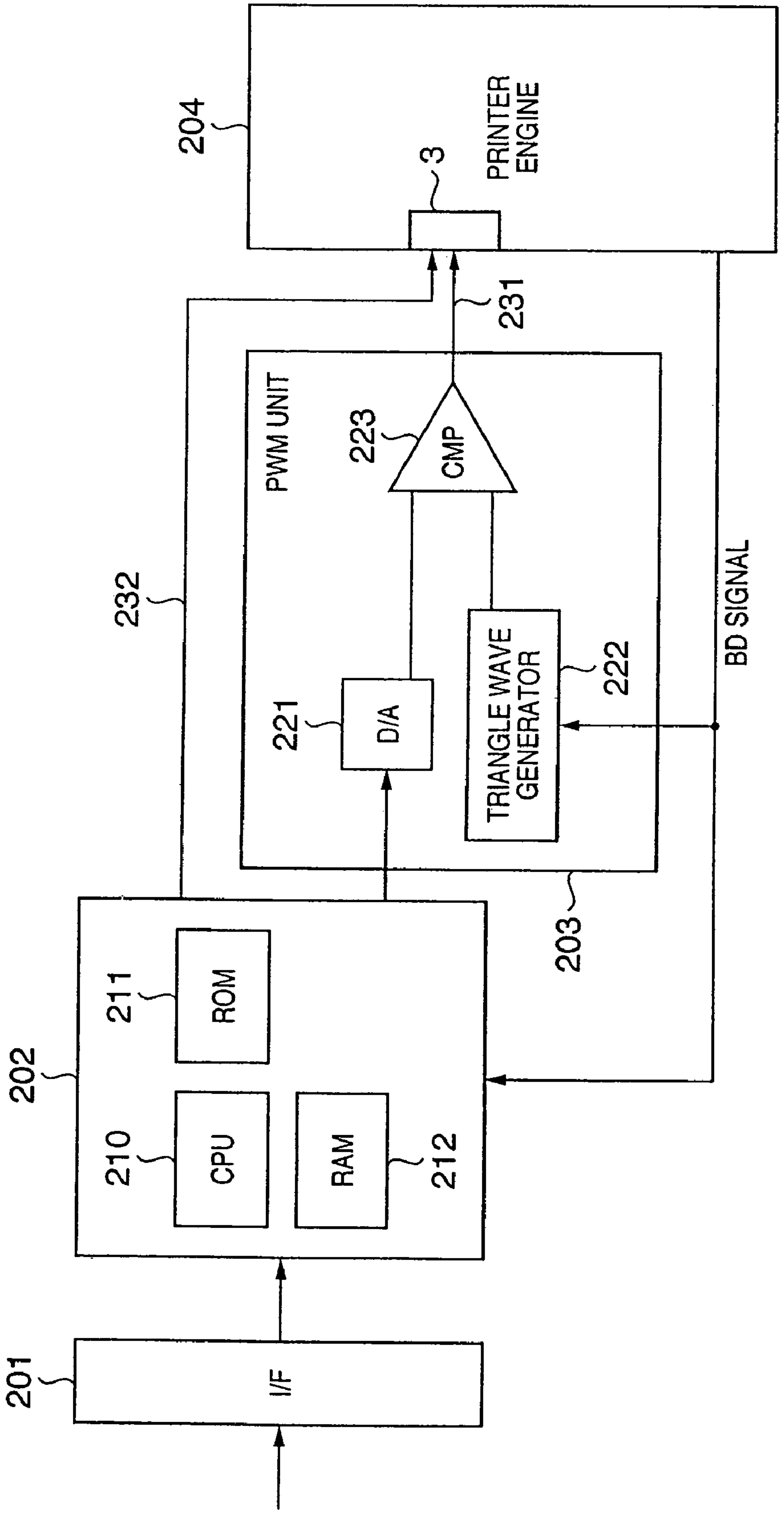
FIG. 2 is a block diagram illustrating main components of a laser printer according to this embodiment.

FIG. 2 is a block diagram illustrating the main configuration of the laser drive unit of the laser printer according to this embodiment.

An interface 201 controls the above described reader unit 200 or a network such as LAN and an interface with a communication channel, receives print data sent through the network and communication channel and outputs the print data to a controller 202. The controller 202 controls the entire operation of this printer and is provided with a ROM 211 which stores a program executed by a CPU 210 and various data and a RAM 212 or the like to temporarily store various data when control processing is executed by the CPU 210. A PWM unit 203 outputs a pulse signal 231 obtained by pulse-modulating the multi-value image data output from the controller 202 according to the value of the multi-value image data. A printer engine 204 has the configuration as shown in FIG. 1, and emits and drives a semiconductor laser by inputting the pulse signal 231 to its exposure unit 3 (which will be described later with reference to FIG. 14) to form an image. A driving voltage control signal 232 is a signal to control a driving voltage when driving the exposure unit 3, and supplied, in a case where the amount of laser light emission corresponding to pixel data is increased to a predetermined amount (R-fold), from the controller 202 in synchronization with an image forming timing of the pixel in a process which will be described later. In this way, the driving voltage of the semiconductor laser is increased by the amount indicated by the driving voltage control signal 232 and the amount of laser light emitted from the semiconductor laser is increased according to the driving voltage control signal 232.

The PWM unit 203 is provided with a D/A converter 221 which D/A-converts multi-value image data, a triangle wave generator 222 which generates a triangle wave signal synchronized with a BD (beam detect) signal (horizontal synchronized signal) output from the printer engine 204 and a comparator 223 which compares the analog image signal converted by the D/A converter 221 with the triangle wave signal and outputs a pulse signal 231 obtained by pulse-width modulating the comparison result. The BD signal is a signal (horizontal synchronized signal) which specifies a scanning start timing for scanning the photosensitive drum 1 with the laser light and the multi-value image data of an image formed by the scanning is output from the controller 202 to the PWM unit 203. Upon forming each color image, such synchronization is established for each color image data of each color component and an image corresponding to each color is formed on the photosensitive drum 1.

Figure 14:
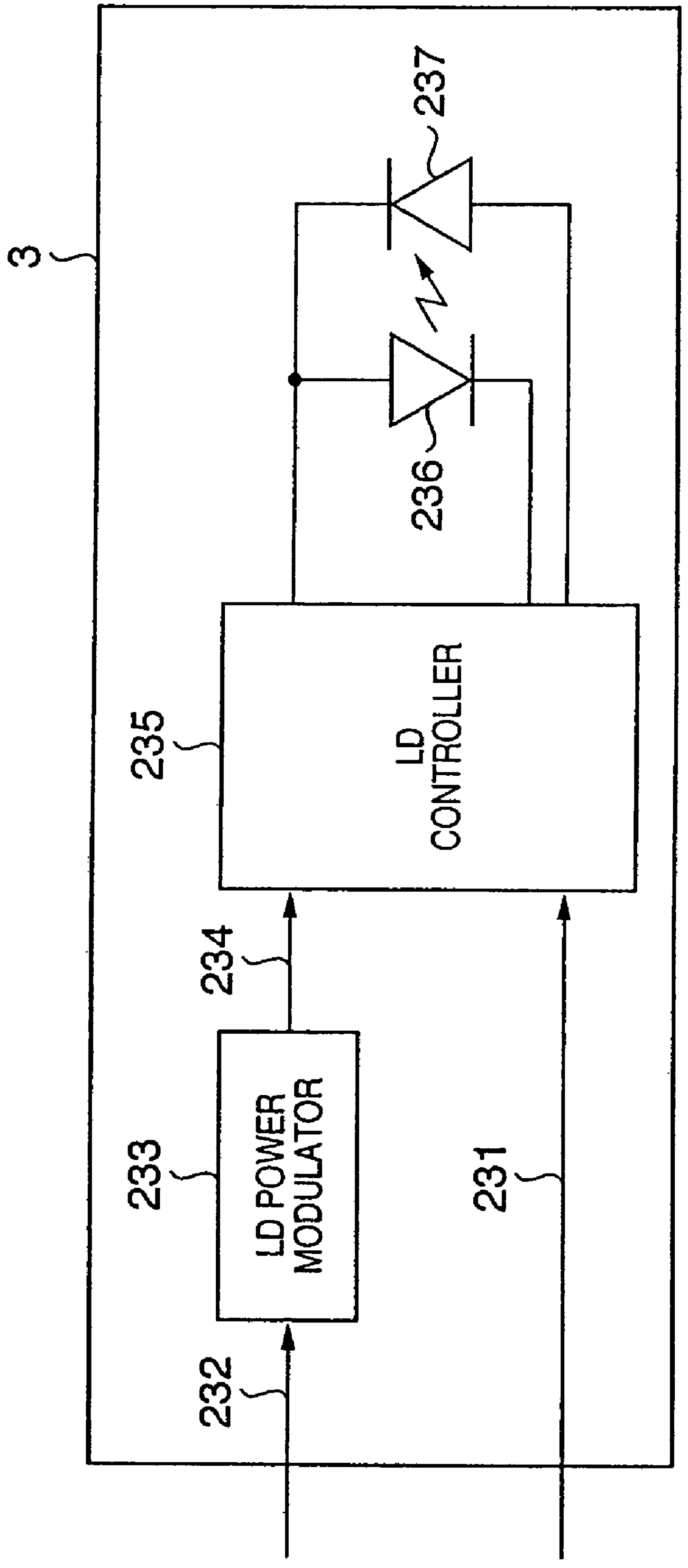
FIG. 14 is a block diagram illustrating the configuration of the exposure unit according to this embodiment.

FIG. 14 is a block diagram illustrating the configuration of the exposure unit 3.

An LD power modulator (laser driving power modulator) 233 outputs light amount data 234 which sets an amount of light emission of a semiconductor laser 236 according to the driving voltage control signal 232. An LD controller (laser driving controller) 235 inputs the light amount data 234 and a pulse signal 231 which is pulse-width modulated according to the image signal and controls the light-emitting time and light-emitting power of the semiconductor laser 236. A diode 237 is a photodiode to monitor the amount of light emission of the semiconductor laser 236.

Figure 3:
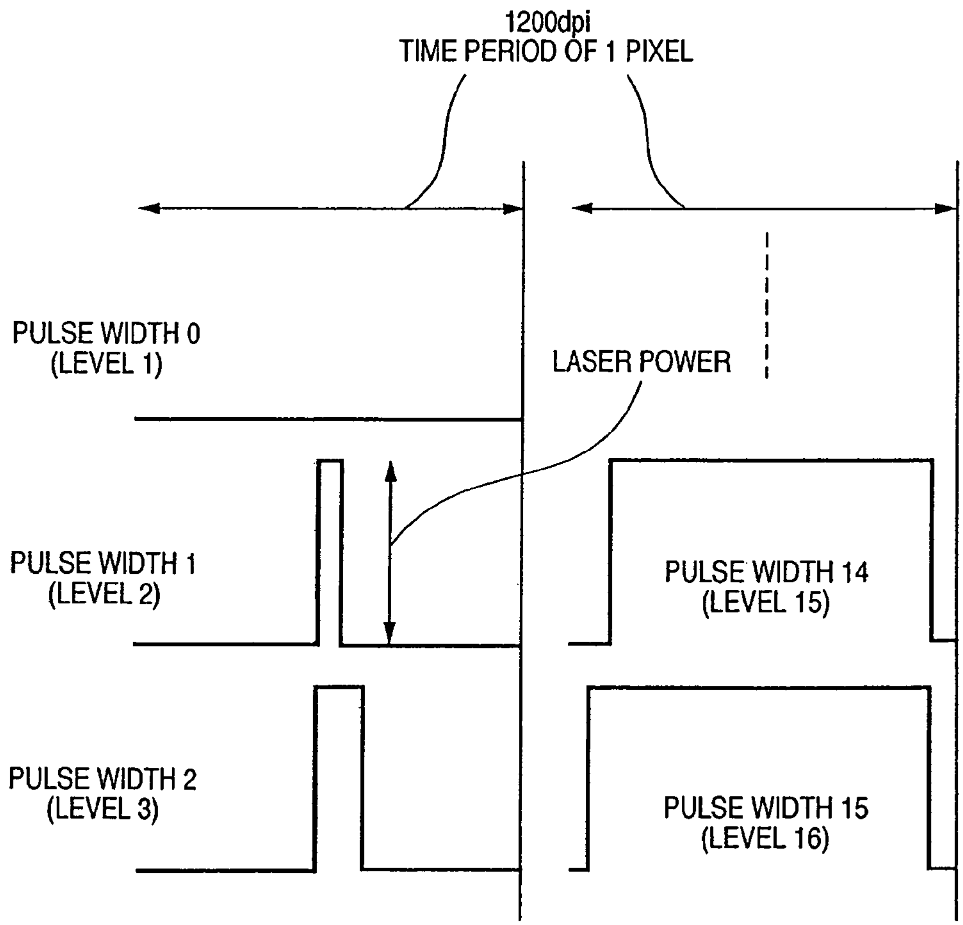
FIG. 3 depicts a view explaining a laser driving pulse in a case that 1 pixel is expressed by 16-level gradation with a resolution of 1200 dpi.

FIG. 3 depicts a view illustrating a laser driving pulse (corresponding to pulse width modulation signal 231), in a case where one pixel is expressed by 16-level gradation with a resolution of 1200 dpi.

Here, the time width (time period) per pixel (pixel period) is a time that a pixel width corresponding to a resolution of 1200 dpi is scanned with the laser light. A pixel can be formed with 16-level gradation by changing the pulse width of a pulse signal which drives the semiconductor laser 236 within this 1-pixel period from (0) during which no pulse signal is output to a maximum pulse width (15). Furthermore, the level (amplitude) of the above described pulse signal is changed according to the light-emitting power of the semiconductor laser 236.

Figure 4:
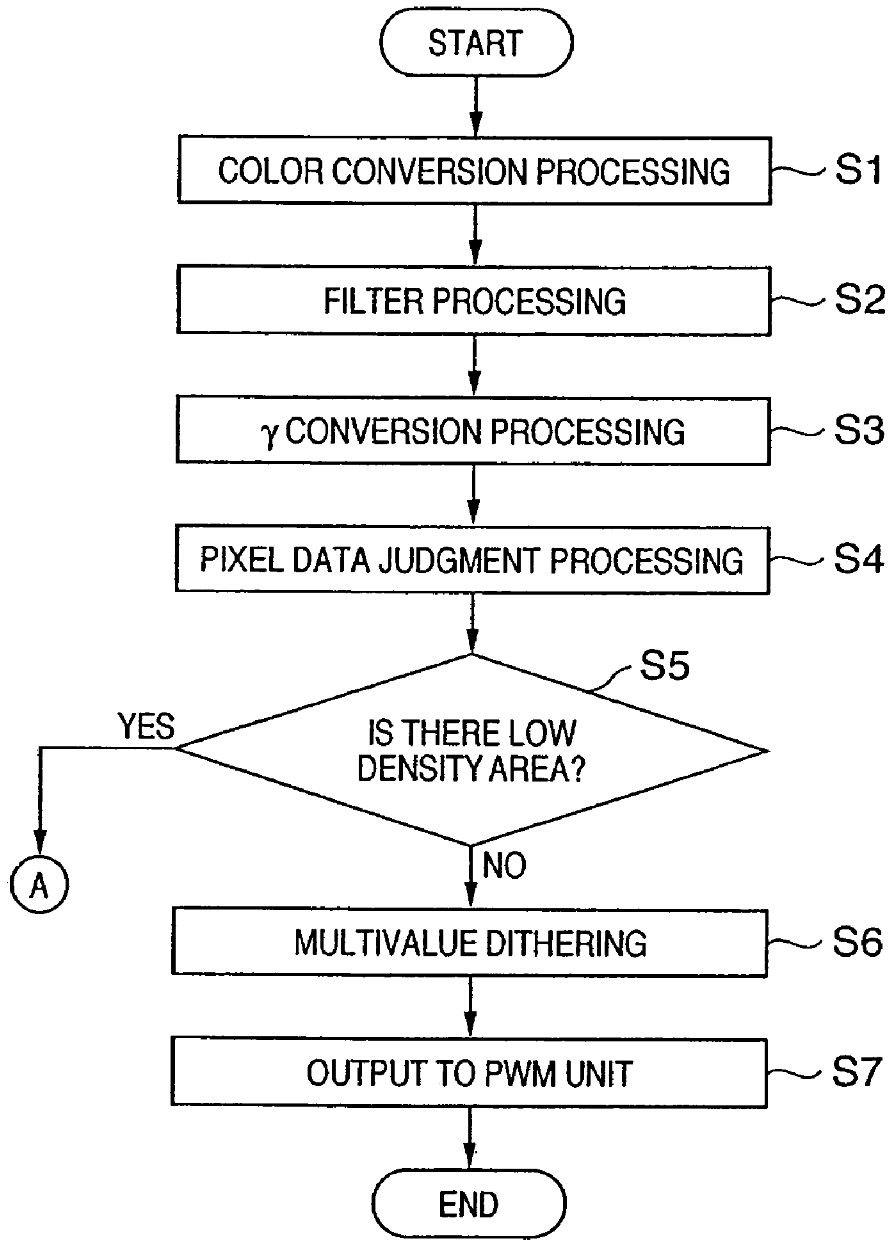
FIG. 4 is a flow chart explaining image processing by the laser printer according to this embodiment.
Figure 5:
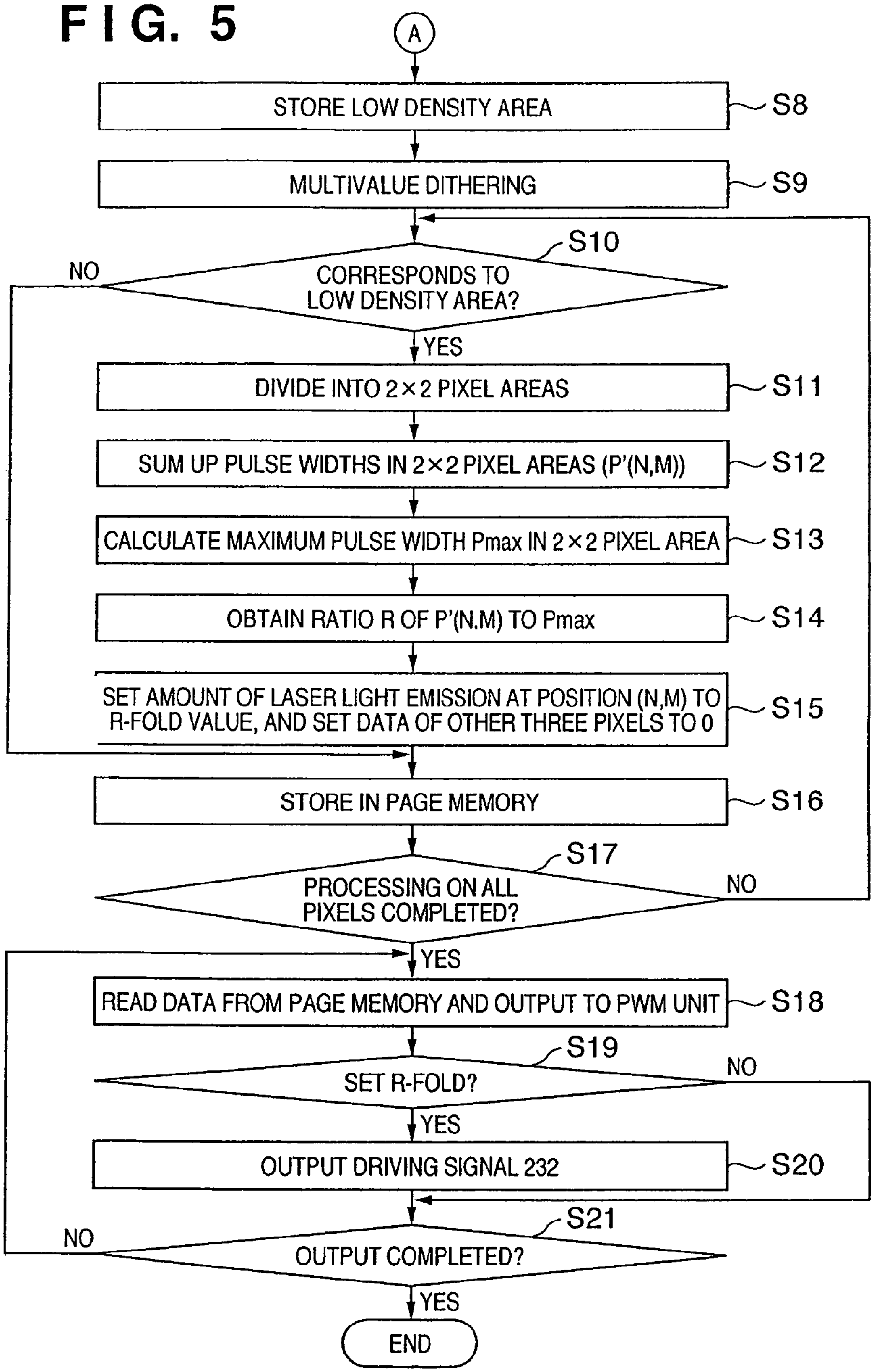
FIG. 5 is a flow chart explaining image processing by the laser printer according to this embodiment.

FIG. 4 and FIG. 5 are flow charts illustrating image processing by the laser printer according to this embodiment, and the program which executes this processing is stored in the ROM 211 and executed under the control of the CPU 210.

An image signal input from the interface unit 201 is subjected to predetermined color conversion processing in step S1. Next, in step S2, filter processing is applied to the image signal subjected to the color conversion processing and in next step S3, gamma conversion processing is applied so as to obtain a desired gradation characteristic according to the characteristic and environment of the image forming apparatus. Next, in step S4, pixel data included in image data corresponding to 1 page is examined to judge whether or not there is an area in which pixels whose pixel value is equal to or lower than a predetermined value are concentrated (low density area). Here, for example, when the pixel data is expressed by 8 bits, it is determined whether or not there is an area including, for example, at least 10×10 pixels where pixels including pixel data "23" or less which is substantially 9% of a maximum value "255" exist in succession. In step S5, in a case where it is determined that such a pixel area (low density area) does not exist, the process advances to step S6, image data corresponding to 1 page subjected to predetermined halftone processing, for example, multi-value dithering with 166 lines is generated and stored in a page memory of the RAM 212. Next, in step S7, the image data stored in the page memory are read sequentially and output to the PWM unit 203. An image based on the image data subjected to multi-value dithering is formed in this way.

On the other hand, in step S5, in a case where it is determined that a low density area in which pixels with a low optical density are concentrated exists in the image, the process advances to step S8 (FIG. 5).

In step S8 of FIG. 5, the position coordinates at which the low density area exists are stored in RAM 212. Next, in step S9, multi-value dithering is performed on the entire image. In processes in step S10 to step S17, processing on the multi-value dithered pixel data is executed. First, in step S10, it is determined whether the multi-value dithered pixel data to be processed are pixels corresponding to the low density area or not. This is judged based on the position coordinates stored in step S8. Here, in a case where it is determined that the pixels do not correspond to the low density area, the process advances to step S16 and the pixel data is stored in the page memory of RAM 212 as is.

On the other hand, in a case where it is determined in step S10 that the pixels correspond to the low density area, the process advances to step S11 and a 2×2 pixel area containing the pixel data is extracted first. Here, suppose the position of the pixel data to be interested (top left viewed from the main/sub scanning position) is (main scanning position, sub scanning position)=(N,M) for each area. Next, in step S12, the pulse widths of four pixel data {(N,M),(N+1,M),(N,M+1), (N+1, M+1)} including this pixel data to be interested are summed up and suppose its total value is P'(N,M). The pulse width of each pixel data is determined based on the value of the pixel data as shown in above described FIG. 3. Next, in step S13, suppose the maximum pulse width out of the pulse widths corresponding to the four pixel data is Pmax. Next, in step S14, a ratio R(N,M)(=P'(N,M)/Pmax) of this total value P'(N,M) to a maximum pulse width Pmax is calculated. In step S15, the scaling factor R is stored in correspondence with the pixel data so that the amount of laser light corresponding to the image position (N,M) is increased by this ratio R(N,M) (the pulse width is Pmax reference). The other pixel data are set to “0” and stored in the page memory in step S16. In step S16, it is determined whether the processing on all pixels subjected to multi-value dithering of the image data has been completed or not and if not completed, the process advances back to step S10 and the above described processing is executed. When the process in step S15 is executed, since the referenced 2×2 pixels have already been processed, the fact that the pixels have already been processed is stored so that they are not referenced in subsequent processes in steps S11 to S14. Next, pixels which have been checked in step S10, included in the low density area and not processed yet will be processed in and after step S11.

When the processing on the pixel data corresponding to one page is completed in this way, the process advances to step S18, the print data stored in the page memory is sequentially read and output to the PWM unit 203. At this time, in step S19, it is determined whether the R-fold information set in above step S15 is stored in correspondence with the read pixel data or not. In a case that the information is not stored, it is normal image formation and so the process advances to step S21, but in a case that the information is stored, the process advances to step S20 and the driving control signal 232 is output to the printer engine 204 according to the R-fold information. This causes the amount of laser light corresponding to the pixel to be increased R-fold. In step S21, it is examined whether the output of all the image data of the page memory has been completed or not, and if the output has not been completed, the process advances back to step S18 and the above described processing is executed. If the output of all print data of the page memory is completed, this processing is finished. This R-fold information includes, for example, the same memory space as the page memory and may be stored in a flag memory which stores the information as a flag (multi-value) at an address which corresponds to each pixel position.

When, for example, the pulse widths of the respective pixels are pixel (N,M)=15, pixel (N+1,M)=15, pixel (N, M+1)=15 and pixel (N+1,M+1)=15, the total pulse width P'(N,M) becomes “60” and maximum pulse width Pmax becomes “15.” The ratio R(N,M) in this case becomes (60/15=) “4.” Therefore, the light-emitting condition of the pixel (N,M) is such that laser light is emitted and driven so that the pulse width remains “15” and the amount of laser light becomes quadruple (=0.68×4=2.72 mW or equivalent). For other pixels (N+1,M), (N,M+1), (N+1,M+1), laser light emission is stopped (the pulse width is set to “0”).

In a case that the pulse width of each pixel is, for example, pixel (N,M)=10, pixel (N+1,M)=12, pixel (N,M+1)=0, pixel (N+1,M+1)=8, the total pulse width P'(N,M) becomes “30” and maximum pulse width Pmax becomes “12”. The ratio R(N,M) in this case becomes (30/12=) “2.5”. Therefore, the light-emitting condition of pixel (N,M) is such that laser light is emitted and driven with the maximum pulse width set to “12” and the amount of laser light set to 2.5 times (=0.68×2.5=1.7 mW or equivalent). Laser light emission is stopped (pulse width set to “0”) for other pixels (N+1,M), (N,M+1), (N+1,M+1).

Figure 6:
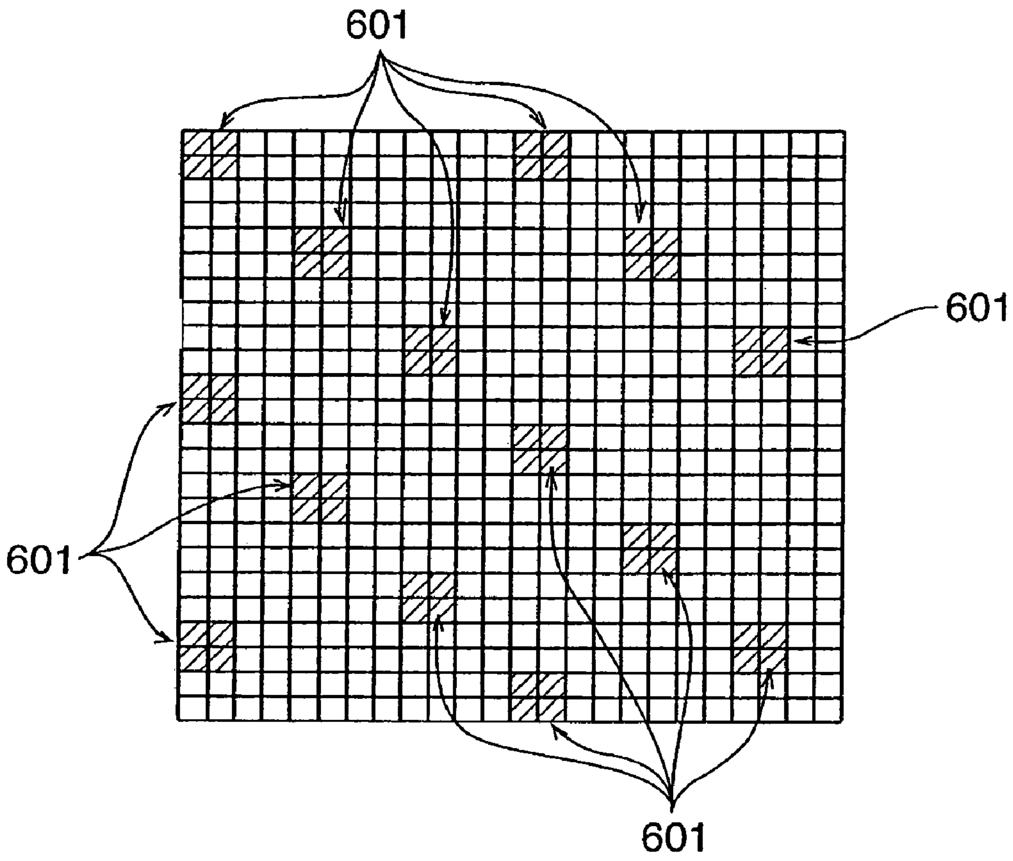
FIG. 6 depicts a view illustrating an example of dot distribution in a low density area.

FIG. 6 depicts a view illustrating an example of a dot distribution in such a low density area.

This low density area shows a pixel area of, for example, approximately “10” levels with respect to maximum “255” levels. If the above described processing is executed on such a low density area, only the pixel to be interested at the top left is formed in each black area 601 made up of 2×2 pixels with the amount of laser light at the scaling factor obtained through the above described calculation, but other three pixels are set to “0” and no pixel is formed.

In a case that an image was formed under the above described condition, it was possible to realize the stability in the optical density of the highlight area within a ±5% range of the target optical density and reproduce satisfactory highlights regardless of the environment and operating conditions.

Figure 7:
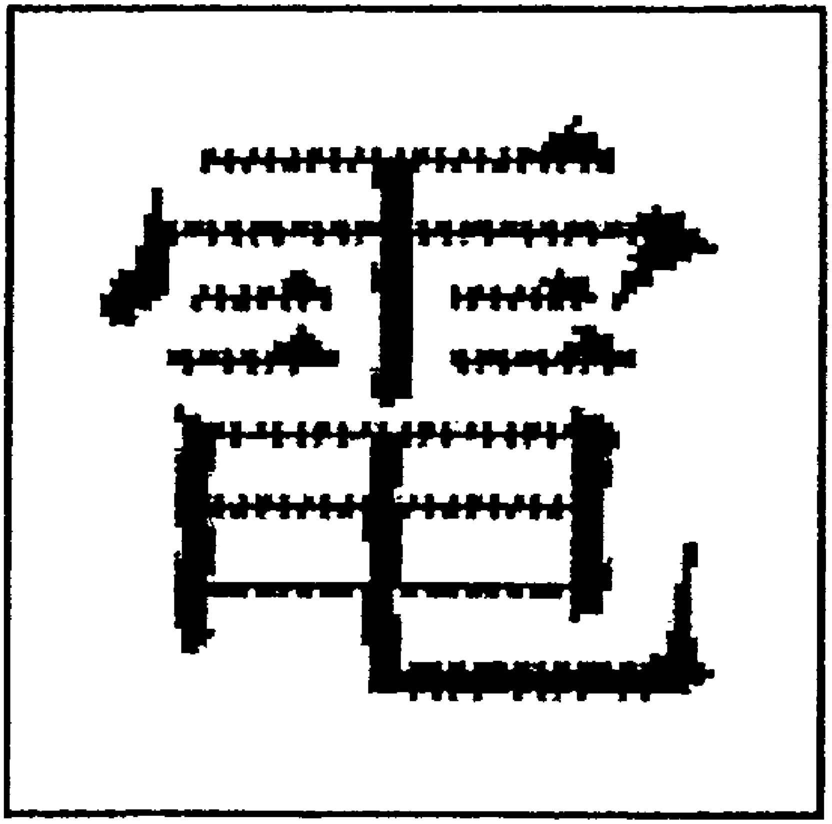
FIG. 7 depicts a view illustrating an example of printing of a 5-point Mincho typeface Kanji character according to this embodiment.

Furthermore, at the same time, it was also possible to realize a satisfactory resolution and proportion with a 5-point Mincho typeface of a Kanji character as shown in FIG. 7.

COMPARATIVE EXAMPLE

When a highlight image was formed without using the configuration of this embodiment, a variation of optical density of the highlight area extended to close to ±10% of the target optical density and variations of gray hue of three colors were particularly large and it was not possible to reproduce satisfactory highlights.

Figure 8:
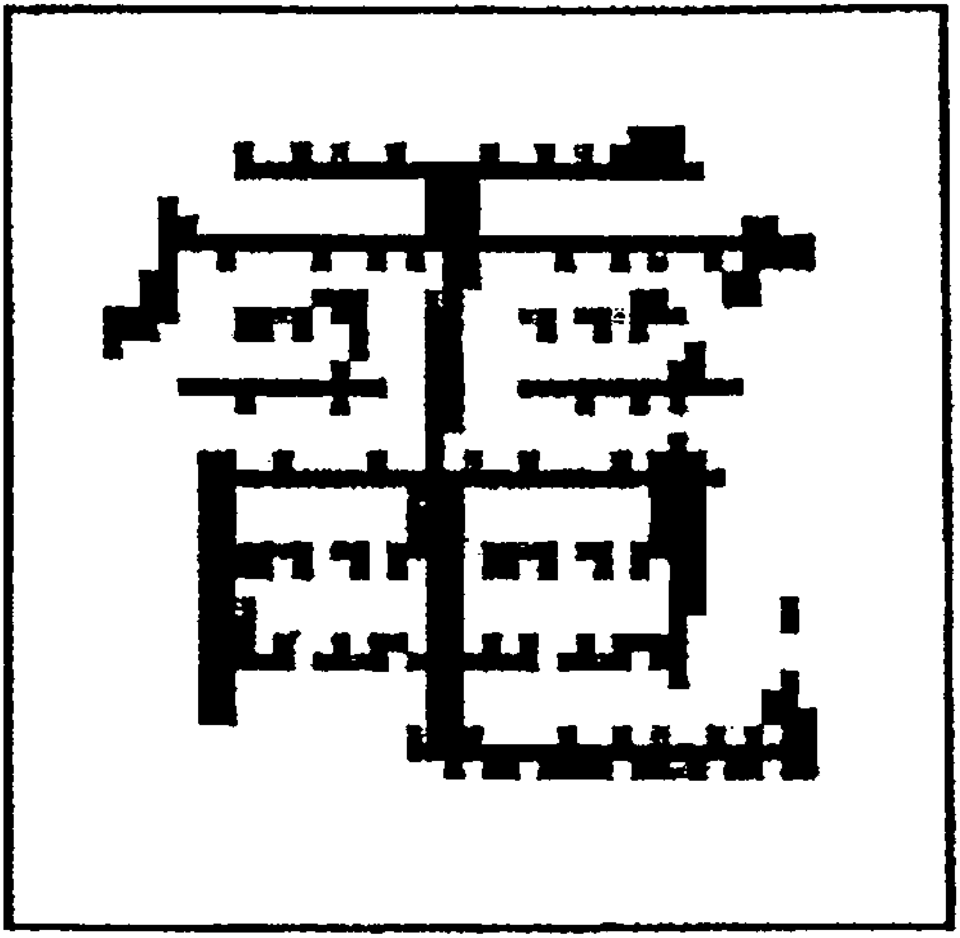
FIG. 8 depicts a view illustrating an example of printing of a 5-point Mincho typeface Kanji character in a comparative example.

On the other hand, in a case where the light-emitting condition was changed regardless of the level or low density area, a 5-point Mincho typeface proportion of the Kanji character as shown in FIG. 8 was disturbed and it was not possible to form a satisfactory character image.

In this embodiment, the amount of light emission is controlled relative to the pixel at the top left of 2×2 pixels, but the present invention is not limited to this and it is also possible to obtain similar effects even when other pixels or a reference position of light emission is changed randomly.

Furthermore, this embodiment uses the area where 10×10 pixels whose pixel data is equal to or less than 9% of the maximum value are concentrated consecutively as a reference for a change of the light-emitting condition, and this is because the image after dithering comes to have 2×2 or fewer pixels through dithering with 166 lines. Therefore, the present invention is not limited to these values and it goes without saying that the reference value for determining the above described area can be changed as appropriate in accordance with the number of lines of dithering and characteristics of the image forming apparatus.

Moreover, this embodiment changes the light-emitting condition under the condition of an area of 2×2 pixels, but it is also possible to change the area condition such as 2×1 pixels, 3×3 pixels in accordance with the characteristics of the image forming apparatus.

Second Embodiment

In the above described first embodiment, the laser light-emitting condition while an image is formed is changed in accordance with the area where pixels whose pixel data has a value equal to or below a predetermined value are concentrated. In this case, because the light-emitting condition is also changed for a character area in which light-color character images are dispersed or isolate points exist, and therefore the proportion may be disturbed. Especially, for characters equal to or smaller than 4 points in character size, isolate points may be produced more easily. Such isolate points have, for example, 2×2 or fewer pixels with a resolution of 1200 dpi. To make a judgment basically on the entire image area, the processing speed may be reduced depending on the image data.

Therefore, in the second embodiment, processing similar to that of the above described first embodiment is performed on only parts of the image data judged to be tone images. The configuration of a printer according to this second embodiment is the same as the configuration of the laser beam printer 100 according to the above described first embodiment, and therefore explanations thereof will be omitted.

Thus, the second embodiment changes the light-emitting condition with only the tone images included in the image data, and therefore the resolution and sharpness of the light-color character images are kept and the number of pixels to be judged decreases, and therefore the decrease of the processing speed can also be reduced. Furthermore, by increasing the number of lines of multi-value dithering of characters and line images to 268, it is possible to improve the resolution and sharpness of halftone characters and line images compared to the above described first embodiment as shown in FIG. 9A and FIG. 9B.

Figure 9A:
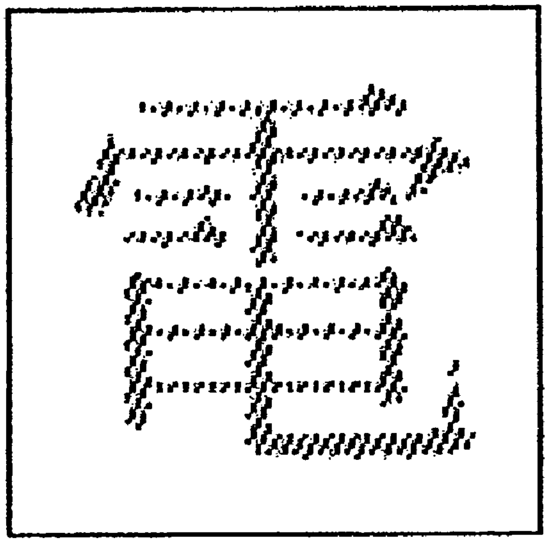
FIG. 9A depicts a view illustrating an example of printing of a 50% halftone character in a case that dithering with 268 lines is applied.
Figure 9B:
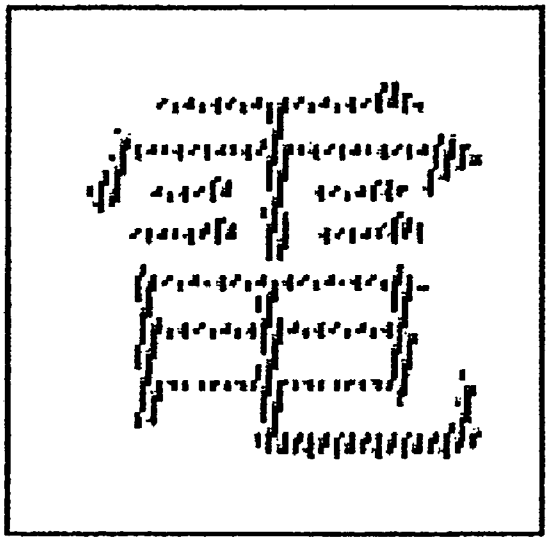
FIG. 9B depicts a view illustrating an example of printing of a 50% halftone character in a case that dithering with 166 lines (first embodiment) is applied.

FIG. 9A shows an example of printing of a 50% halftone character during dithering with 268 lines and FIG. 9B shows an example of printing of a 50% halftone character during dithering with 166 lines (first embodiment).

Figure 10:
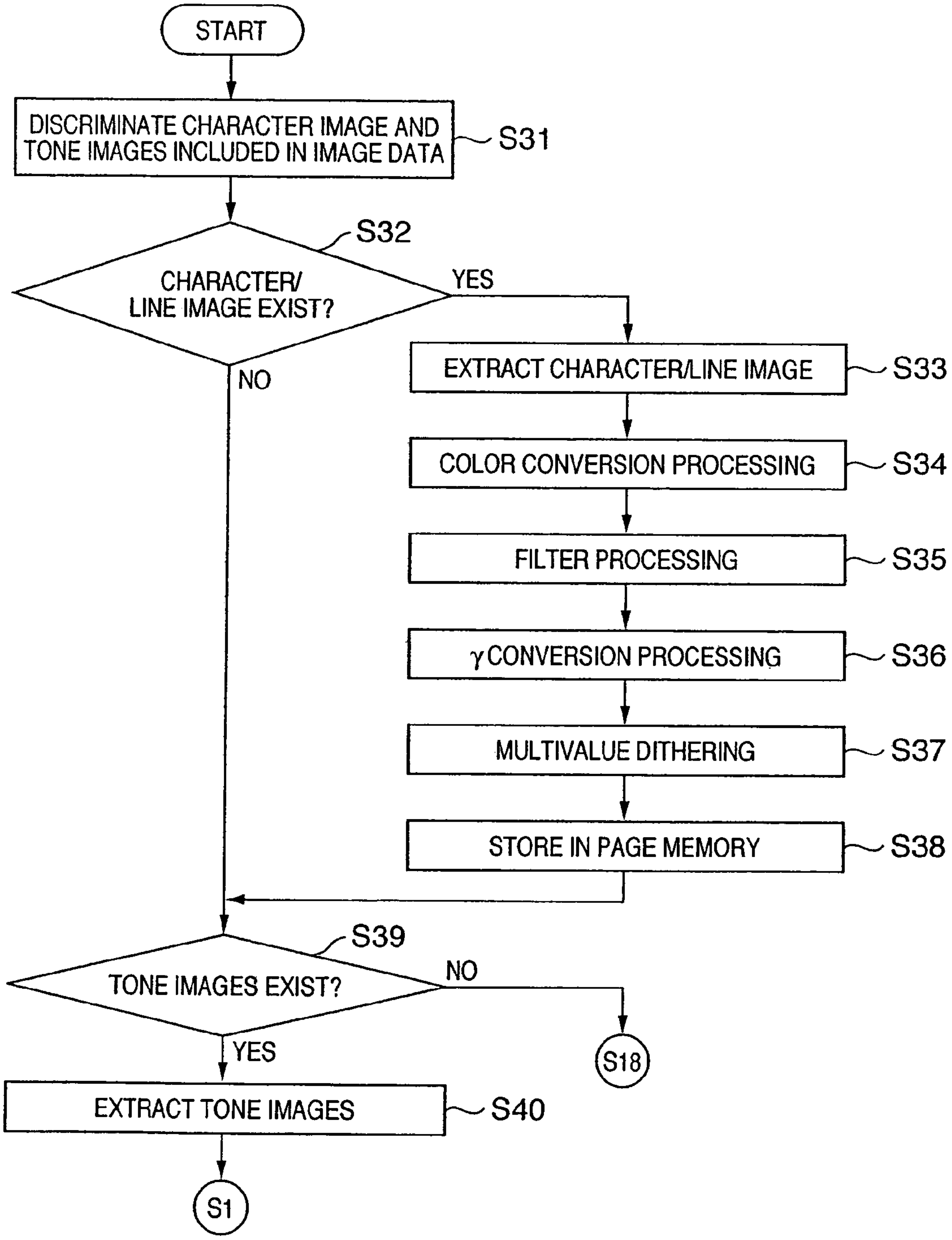
FIG. 10 is a flow chart illustrating processing according to a second embodiment of the present invention.

FIG. 10 shows a flow chart illustrating the processing according to the second embodiment of the present invention and the program which executes this processing is stored in a ROM 211 and executed under the control of a CPU 210.

First, in step S31, character/line images and tone images included in the image data are discriminated. Next, in step S32, it is determined whether the character/line images are included or not and if the character/line images are included, the process advances to step S33 and the characters and line images included in the image are extracted. Next, color conversion processing is performed on the extracted character/line images in step S34, filter processing is performed in next step S35, gamma conversion processing is performed in next step S36, and multi-value dithering is performed in step S37. This multi-value dithering is multi-value dithering with 268 lines. The process moves to step S38, where print data of the multi-value dithered character/line images are stored in the page memory. In this way, the multi-value dithered print data of the character/line images in the image data is stored in the page memory.

Next, in step S39, it is determined whether a tone image is included in the image or not. In a case that the tone image is included, the process advances to step S40 and the tone image is extracted from the image data. The extracted tone image is subjected to the processing shown in processing steps from step S1 in above described FIG. 4. In this case, the multi-value dithering in step S6 in FIG. 4 and step S9 in FIG. 5 is different from that of the above described first embodiment in that multi-value dithering with 166 lines is executed.

Thus, the second embodiment changes laser light-emitting conditions for a low density area of only tone images, keeps resolution and sharpness of the light-color character images, reduces the number of judged pixels and can thereby also reduce the decrease of the processing speed.

By increasing the number of lines of multi-value dithering in characters and line images with respect to the number of lines of tone images, it is also possible to improve resolution and sharpness of halftone characters and line images.

Third Embodiment

The above described first and second embodiments have explained the case where the amount of laser light is changed as the means for changing laser light-emitting conditions. However, in such a case, a maximum of quadruple laser light amount may be required and a semiconductor laser element which allows control over a quadruple light amount is expensive, leading to a cost increase of the apparatus. Therefore, the third embodiment changes light-emitting conditions based on the flow as shown in FIG. 11.

Figure 11:
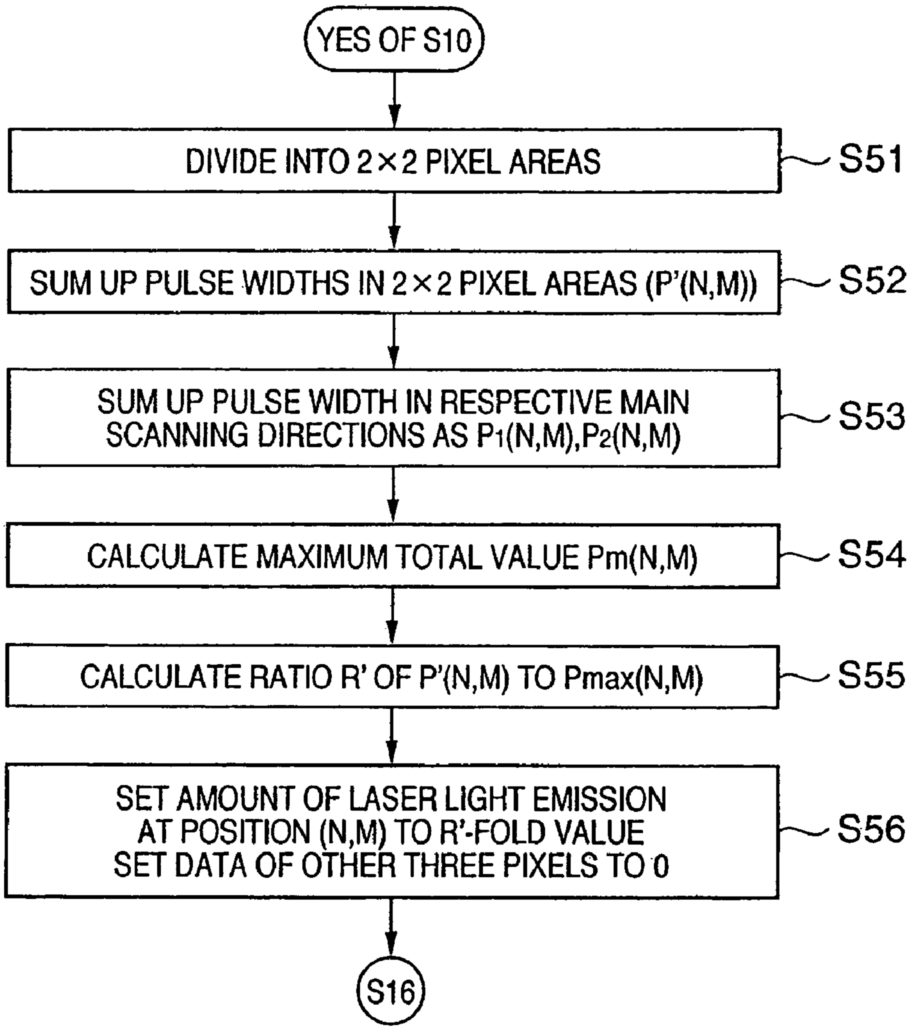
FIG. 11 is a flow chart illustrating processing according to a third embodiment of the present invention.
Figure 12A:
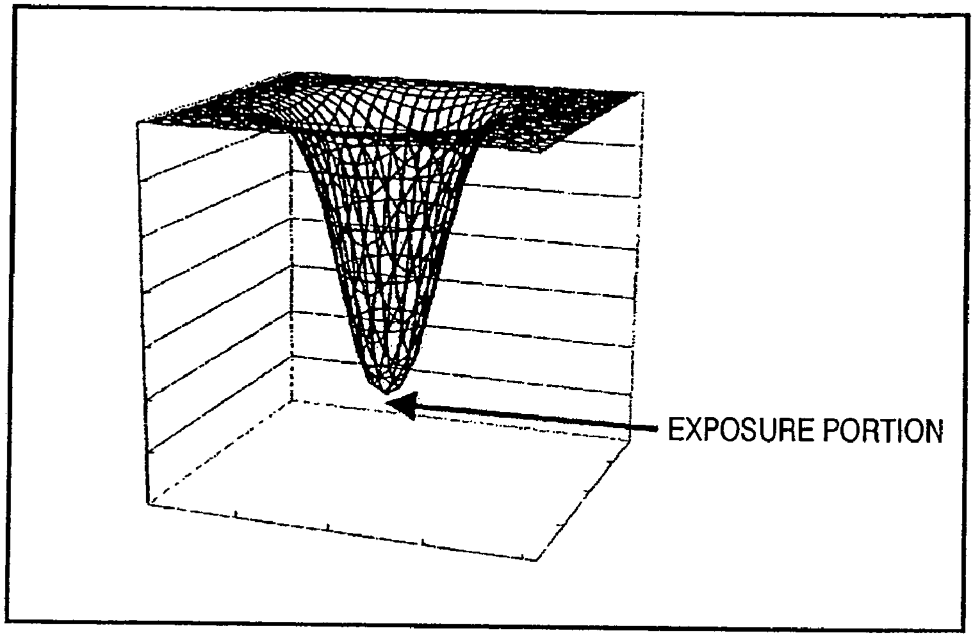
FIG. 12A depicts a schematic view of a latent image profile when an electrostatic latent image of a 1-pixel, 100% image is formed with a resolution of 600×600 dpi on an image carrier.
Figure 12B:
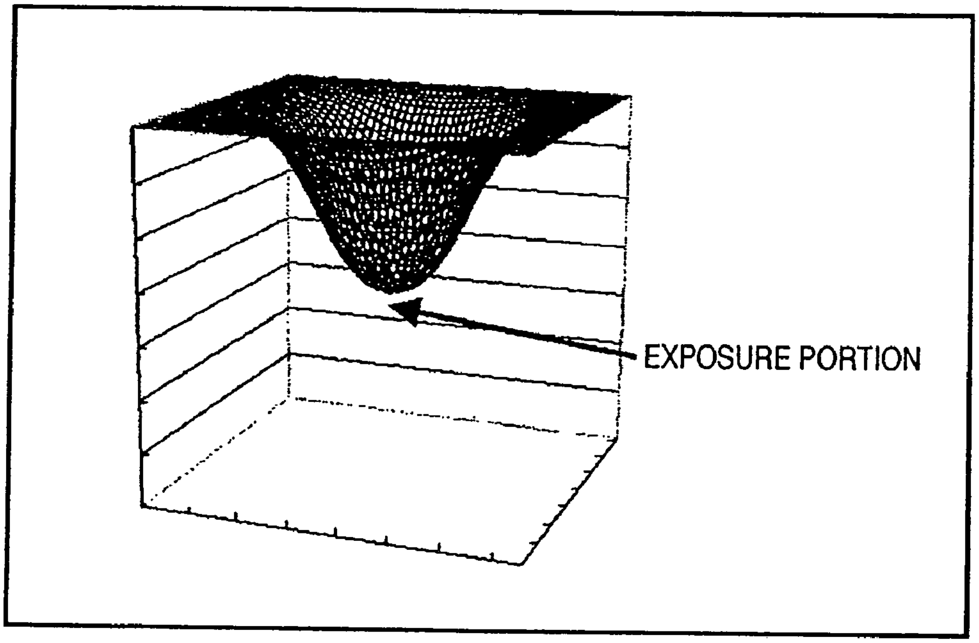
FIG. 12B depicts a schematic view of a latent image profile in a case where an electrostatic latent image of a 1-pixel, 100% image is formed with a resolution of 1200×1200 dpi on an image carrier.
Figure 13A:
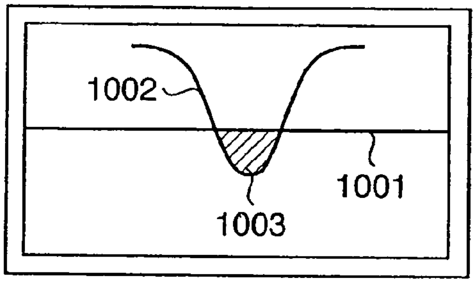
FIG. 13A to FIG. 13F depict views relatively illustrating variation factors of optical density of image based on an electrostatic latent image using a variation of developing bias.
Figure 13D:
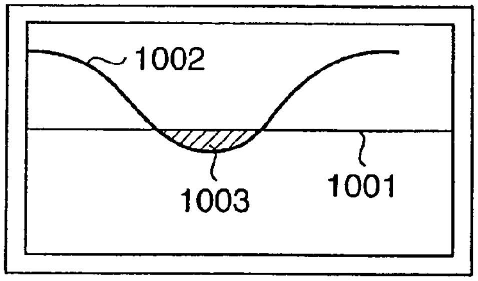
Figure 13B:
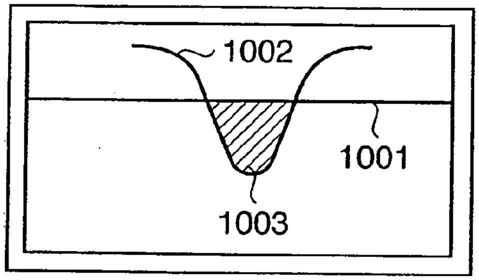
Figure 13E:
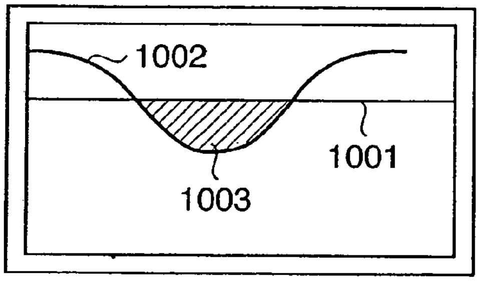
Figure 13C:
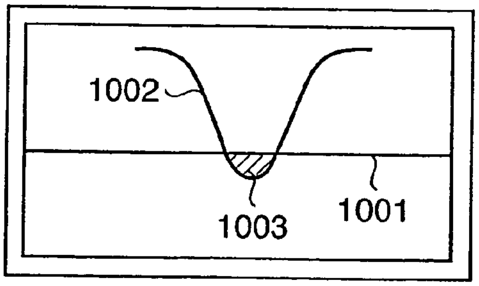
Figure 13F:
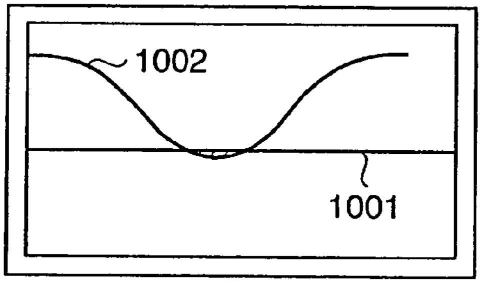

FIG. 11 is a flow chart illustrating processing according to the third embodiment of the present invention and this processing is executed in place of steps S11 to S15 executed when the judgment in step S10 of the flow chart in above described FIG. 5 is "YES." The configuration of the printer according to this third embodiment is the same as the configuration of the laser beam printer 100 according to the above described first embodiment, and therefore explanations thereof will be omitted.

Here, in step S51, pixels in a low density area are divided into areas of 2×2 pixels as in the case of step S11 first and in step S52, the pixel values of the 2×2 pixel areas are summed up. Here, as in the case of above described step S12, pulse widths of four pixel data ((N,M),(N+1,M),(N,M+1), (N+1, M+1)) including pixel data to be interested are summed up and suppose the total value is P'(N, M). Next, in step S53, the image levels (pulse widths) of pixels (N,M), (N+1,M), (N,M+1), (N+1,M+1) in the 2×2 pixel areas are summed up in the main scanning direction respectively to be defined as P1(N, M) (first line) and P2(N,M) (second line) respectively. Next, in step S54, the total values P1(N,M) and P2(N,M) are compared and the larger one is set as a reference Pm(N,M) of the pulse width (Pm(N,M)=MAX{P1(N,M),P2(N,M)}: MAX{A,B} is assumed to mean the larger one of A and B). Next, in step S55, a ratio R'(R'=P'(N,M)/Pm(N,M)) of the total value P'(N,M) obtained in step S52 to reference Pm(N, M) obtained in step S54 is calculated. In step S56, the amount of laser light emission of the pixel to be interested at the position (N, M) is set as a scaling factor R' calculated in step S55. Next, the pixel data of the remaining three pixels of the 2×2 pixels is set to "0." The process then advances to step S16 in FIG. 5.

In this way, in a case that, for example, (N,M)=15, (N+1, M)=15, (N,M+1)=15, (N+1,M+1)=15, the total P1(N,M) of the first line is P1(N,M)=15+15=30 and the total value P2(N, M) of the second line is Pm(N,M)=30 because P2(N,M)=15+15=30. Furthermore, since the total value P'(N,M) of 4 pixels is P'(N,M)=15+15+15+15=60, the ratio R' becomes R'(N, M)=60/30=2. In this case, as the light-emitting conditions of the pixel to be interested at the position (N,M), the pulse width is assumed to be 30, a double amount of laser light=0.68×2=1.36 mW or equivalent is emitted and emissions at (N+1,M),(N,M+1), (N+1,M+1) are stopped (pulse width 0).

Furthermore, when (N,M)=10, (N+1,M)=12, (N,M+1)=0, (N+1,M+1)=8, since the total P1(N,M)=10+12=22 of the first line, the total P2(N,M)=0+8=8 of the second line, Pm(N, M)=22. At this time, since the total value P'(N,M) of 4 pixels is 10+12+0+8=30, the ratio R'(N,M) becomes 30/22=1.3636. Therefore, as the light-emitting conditions of the pixel to be interested at the position (N,M), the pulse width is assumed to be 22, laser light an amount of laser light of 1.37 times=0.68×1.37=0.932 mW or equivalent is emitted and emissions of laser light at the pixel positions (N+1, M), (N,M+1), (N+1, M+1) are stopped (pulse width 0).

When an image is formed under the above described conditions, it is possible to obtain substantially the same effects as those of the first and second embodiments and reduce the increase in the amount of laser light to a maximum of approximately two times, and thereby use a low-cost semiconductor element and also reduce the cost increase.

Furthermore, in the third embodiment, both the laser driving voltage and control of the pulse width are used as the means for changing the light-emitting conditions, but within a range in which the time of the summing level (pulse width) has no effect on other images, it is also possible to change only the pulse width to change the laser light-emitting conditions.

Furthermore, in the first to third embodiments, only the reference pixel (pixel to be interested) out of 2×2 pixels is allowed to emit light and emissions of laser light at the remaining pixel positions are stopped, but the present invention is not limited to this. For example, in a case that the maximum light-emitting intensity of the laser element of the image forming apparatus is exceeded, it is possible to emit an amount of laser light equal to or lower than that of the reference pixel so that a desired optical density is achieved also at pixel positions other than the reference pixel.

Furthermore, in the first to third embodiments, the laser light-emitting conditions are changed based on the proportional relationship between the amount of exposure and the pulse width, but it goes without saying that it is also possible to change the amount of laser light according to the laser light-emitting characteristic and image forming characteristic of the image forming apparatus.

Furthermore, in the first to third embodiments, the relationship between the amount of laser driving and laser driving pulse width can also be changed as appropriate according to the operational environment of the printer and the number of print copies.

As explained so far, according to this embodiment, it is possible to realize a high resolution image forming apparatus capable of achieving reproduction stability of highlight areas in tone images and improvement of resolution of characters and line images, and proportion.

The present invention is not limited to the above embodiment, and various changes and modifications can be made thereto within the spirit and scope of the present invention. Therefore, to apprise the public of the scope of the present invention, the following claims are made.

This application claims the benefit of Japanese Application Nos. 2005-069800 filed on Mar. 11, 2005 and 2006-048981 filed on Feb. 24, 2006 which are hereby incorporated by reference herein in their entirety.

What is claimed is:

1. An image forming apparatus, comprising:

an image carrier;

an exposure unit configured to emit light for exposure onto said image carrier according to image data;

a discrimination unit configured to discriminate a low density area in which density levels of all items of image data in such low density area are less than a predetermined density; and a control unit configured to control a light emitting intensity of said exposure unit for each pixel in the low density area discriminated by said discrimination unit, wherein in a pixel area of N×M pixels (N and M are integers) in the low density area, said control unit determines a pixel of interest in the pixel area, sets a density level of the pixel of interest to a density level based on the density levels of all pixels included in the pixel area, sets a light emitting intensity for the pixel of interest to a first light emitting intensity which is more than a predetermined intensity, and sets light emitting intensities for pixels other than the pixel of interest to light emitting intensities which are less than the predetermined intensity.

2. The image forming apparatus according to claim 1, wherein said control unit controls the light emitting intensity based on image data obtained by multi-value dithering the image data.

3. The image forming apparatus according to claim 1, wherein said control unit comprises:

a calculation unit configured to sum up density levels of all pixels in the pixel area; and a determination unit configured to determine a maximum density level of the density levels of all pixels in the pixel area;

wherein said control unit sets the first light emitting intensity for the pixel of interest by using the summed value calculated by said calculation unit and the maximum density level determined by said determination unit.

4. The image forming apparatus according to claim 1, wherein said control unit comprises:

a calculation unit configured to calculate a first total value obtained by summing up density levels of pixels of a first line in the pixel area and a second total value obtained by summing up density levels of pixels of a second line in the pixel area; and a determination unit configured to determine a maximum density level of all pixels in the pixel area, wherein said control unit sets the first light emitting intensity for the pixel of interest by using the first and second total values and the maximum density level determined by said determining unit.

5. An image forming apparatus comprising:

an image carrier;

an exposure unit configured to emit light for exposure onto said image carrier according to image data;

a discrimination unit configured to discriminate an image area and a line area in the image data, wherein the line area comprises character and line area;

a control unit configured to control a light emitting intensity of said exposure unit for each pixel in the image area discriminated by said discrimination unit, wherein in a pixel area of N×M pixels (N and M are integers) in the image area, said control unit determines a pixel of interest in the pixel area, sets a density level of the pixel of interest to a density level based on the density levels of all pixels included in the pixel area, sets a light emitting intensity for the pixel of interest to a first light emitting intensity which is more than a predetermined intensity, and sets light emitting intensities for pixels other than the pixel of interest to light emitting intensities which are less than the predetermined level.

6. A method for controlling an image forming apparatus for forming an image on a recording medium, wherein the image forming apparatus comprises an image carrier and an exposure unit which emits light for the exposure onto the image carrier according to image data, said method comprising:

a discrimination step of discriminating a low density area in which density levels of all items of image data in such low density area are less than a predetermined density; and a control step of controlling a light emitting intensity of the exposure unit for each pixel in the low density area discriminated in said discrimination step, wherein in a pixel area of N×M pixels (N and M are integers) in the low density area, said control step determines a pixel of interest in the pixel area, sets a density level of the pixel of interest to a density level based on the density levels of all pixels included in the pixel area, sets a light emitting intensity for the pixel of interest to a first light emitting intensity which is more than a predetermined intensity, and sets light emitting intensities for pixels other than the pixel of interest to amounts which are less than the predetermined intensity.

7. The control method according to claim 6, wherein in said control step, the light emitting intensity is controlled based on image data obtained by multi-value dithering the image data.

8. The control method according to claim 6, wherein said control step comprises:

a calculation step of summing up density levels of all pixels in the pixel area; and a determination step of determining a maximum density level of all pixels in the pixel area;

wherein in said control step, the first light emitting intensity for the pixel of interest is set by using the summed value and the maximum density level determined in said determination step.

9. The control method according to claim 6, wherein said control step comprises:

a calculation step of calculating a first total value obtained by summing up density levels of pixels of a first line in the pixel area and a second total value obtained by summing up density levels of pixels of a second line in the pixel area; and a determination step of determining a maximum density level of all pixels in the pixel area, wherein in said control step, the first light emitting intensity for the pixel of interest is set by using the first and second total values and the maximum density level determined in said determination step.

10. A method for controlling an image forming apparatus for forming an image on a recording medium, wherein the image forming apparatus comprises an image carrier and an exposure unit which emits light for exposure onto the image carrier according to image data, said method comprising:

a discrimination step of discriminating an image area and a line area in the image data, wherein the line area comprises character and line area;

a control step of controlling a light emitting intensity of the exposure unit for each pixel in the image area discriminated in said discrimination step, wherein in a pixel area of N×M pixels (N and M are integers) in the image area, said control step determines a pixel of interest in the pixel area, sets a density level of the pixel of interest based on the density levels of all pixels included in the pixel area, sets a light emitting intensity for the pixel of interest to a first light emitting intensity which is more than a predetermined intensity, and sets light emitting intensities for pixels other than the pixel of interest to amounts which are less than the predetermined intensity.

* * * * *